United States Patent [19]

Hedlund et al.

[11] 4,142,209
[45] Feb. 27, 1979

[54] DISC TRACK SERVO SYSTEM

[75] Inventors: Lee V. Hedlund, Cinnaminson; Ronald P. Fink, Marlton; David I. Wright, Riverton, all of N.J.

[73] Assignee: RCA Corporation, New York, N.Y.

[21] Appl. No.: 777,474

[22] Filed: Mar. 14, 1977

[30] Foreign Application Priority Data

Mar. 19, 1976 [GB] United Kingdom ............... 11118/76
Mar. 8, 1977 [GB] United Kingdom ............... 11118/77

[51] Int. Cl.² .............................................. G11B 7/00
[52] U.S. Cl. ............................ 358/128; 179/100.3 V; 360/77; 365/234
[58] Field of Search ................ 340/173 LM, 173 LT; 360/77, 78, 72, 10, 35; 358/128, 147; 179/100.3 B, 100.3 V; 365/215, 234

[56] References Cited

U.S. PATENT DOCUMENTS

| 3,493,674 | 2/1970 | Houghton ............................ 358/147 |
| 3,576,391 | 4/1971 | Houghton ............................ 358/147 |
| 3,654,624 | 4/1972 | Becker et al. ................. 340/173 LM |
| 3,796,825 | 3/1974 | Redlich et al. ........................ 358/128 |
| 3,881,184 | 4/1975 | Koepcke et al. ....................... 360/78 |
| 3,931,457 | 1/1976 | Mes ...................................... 358/128 |
| 3,946,367 | 3/1976 | Wohlmut et al. ............. 340/173 LM |
| 3,956,766 | 5/1976 | Hanson et al. ......................... 360/78 |
| 4,028,733 | 6/1977 | Ulicki .................................... 360/10 |

OTHER PUBLICATIONS

Darrington, "Wireless World Teletext Decoder 1 — The Background", *Wireless World*, vol. 81, No. 1479, pp. 498–504, Nov. 1975.

*Primary Examiner*—Stuart N. Hecker
*Assistant Examiner*—Donald McElheny
*Attorney, Agent, or Firm*—E. M. Whitacre; J. S. Tripoli; J. D. Lazar

[57] ABSTRACT

Apparatus for optically recording and reading information on a disc medium rotating surface. The information is recorded on concentric or spiral tracks continuously or in parts. The information, which can represent, for example, television video, x-ray, or digital data signals, are addressed by codes that identify the track on which the information is recored preceded by the address code. The recording mechanism can record a new track adjacent to the previous track if the disc has been moved between recordings. There are also means for compensating for eccentricity errors introduced by small changes in the radial dimensions of the disc. The spacing between tracks is typically 2.5 microns although the eccentricity errors may exceed the span of ten tracks. Typically, 4,000 tracks per cm can be recorded.

4 Claims, 13 Drawing Figures

DISC TRACK SERVO SYSTEM

CROSS REFERENCE TO RELATED APPLICATIONS

This application is related to the following copending applications, U.S. application Ser. No. 668,504, filed Mar. 19, 1976, entitled "Ablative Optical Recording Medium," by R. Bartolini, et al.; U.S. application Ser. No. 668,748, filed Mar. 19, 1976, entitled "Ablative Optical Recording Medium," by A. Bloom, et al., now U.S. Pat. No. 4,023,185, issued May 10, 1977; U.S. application Ser. No. 777,475, entitled "Eccentricity Compensating System," by L. Hedlund, et al.; U.S. application Ser. No. 777,478, entitled "Disc Positioning and Speed Servo Mechanism," by A. Goldschmidt; U.S. application Ser. No. 777,477, entitled "Compensation Apparatus for a Servo System with Periodic Command Signals," by E. Fox, et al.; U.S. application Ser. No. 777,476, filed concurrently herewith and, entitled "Capacitance Distance Sensor Apparatus," by W. E. Barnette, et al.

BACKGROUND

This invention relates generally to record and playback systems used with discs, drums, or similar rotating surfaces, and particularly to systems equipped to locate an addressed track on the surface by moving a transducer means in a direction perpendicular to the tracks.

Prior art information storage systems utilize magnetic and optical recording tracks or tape, disc, and drum surfaces. The packing density, which is inversely proportional to the track spacing, has been significantly increased in optical systems utilizing the laser as the optical transducer. Nevertheless, the known systems do not provide for noncontinuous recording when the track spacing is very close because of the difficulty involved in precisely relocating the transducer after it has been moved with respect to the recording surface. Several problems relating to non-continuous recording systems have heretofore remained without satisfactory solutions. One such problem is the mechanical positioning of the medium after removal and remounting for recording subsequent tracks. Another problem is caused by the eccentricity errors of the surface resulting from distortion and deformation of the surface structure by thermal effects, inter alia. The eccentricity alters the track position profiles of previously recorded tracks and cause track spacing deviations that may exceed the system track spacing. As a result, a new track might overlay a previously recorded track and the information recorded thereon would be lost. The present invention provides means for solving these problems.

According to the present invention, an optical record and playback apparatus using a light sensitive surface capable of instantaneous playback is provided with an optical transducer moveable to a selected addressable track. Piecemeal recording is achieved by addressing the last track recorded on a partially recorded surface and positioning the transducer to record the next successive track.

DETAILED DESCRIPTION

As will be illustrated by the embodiment to be described, the invention provides for a means to store, in a high density environment, information or data that can be located for rapid, random retrieval access at any time following the recordation. Although the principles of the invention are described and illustrated in their application to a video disc record and playback system by which data is processed on a real time basis, it is noted that they also apply to other forms and shapes of rotating recording media such as drums, cylinders, and the like. Furthermore, while the preferred embodiment of the invention is explained and illustrated as a recording system for video (television) type signals, the principles of the invention are equally applicable to other forms of encoded data such as audio, audio plus video, x-ray, multiplexed frequency modulation (FM) and pulse code modulation (PCM) signals and digital data. Furthermore, the manner in which the signals are recorded on the desired medium is a matter of choice.

Data are stored on precisely located tracks for rapid retrieval. Recordation is achieved on a light sensitive disc into which (by ablation or melting) data are permanently recorded. The recorded data is available immediately without further processing of any kind.

Figure 1:
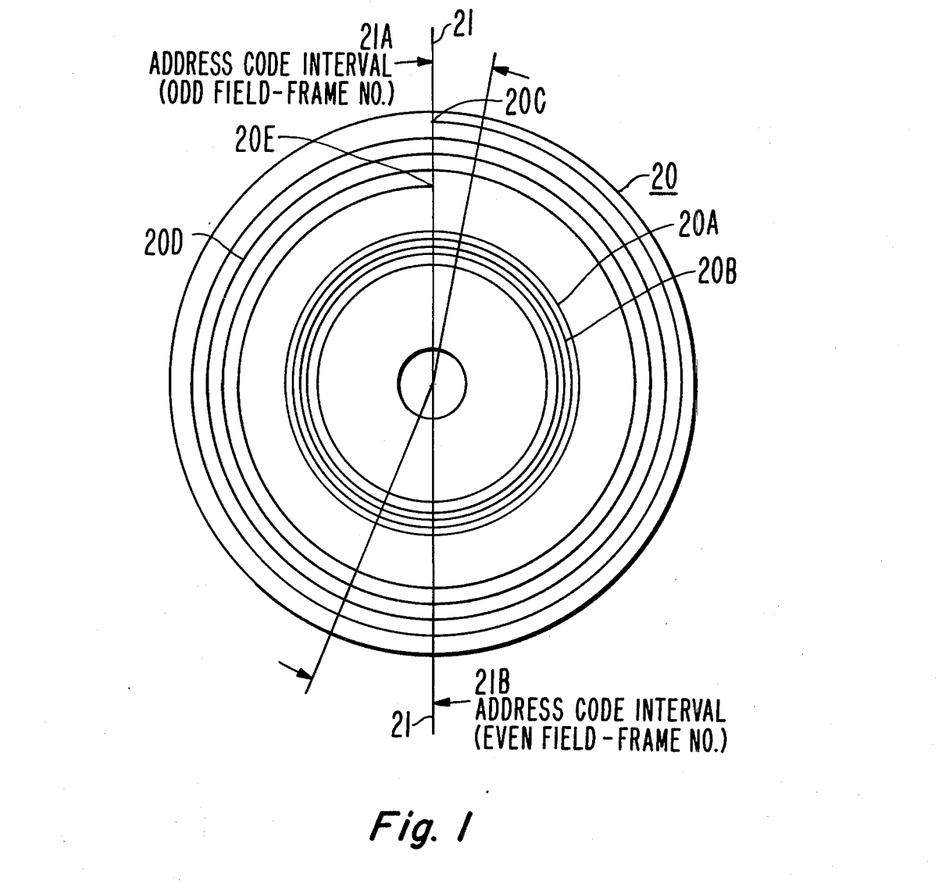
FIG. 1 is a plan view of the tracks on a disc.

A disc 20 as illustrated in FIG. 1 is formed having a laser sensitive material providing a surface upon which ablative recording by the thermal effects of focused laser beams may be made. The surface should be non-reflective for best results. A preferred disc for ablative recording is disclosed in the above-identified copending U.S. patent applications Ser. No. 668,504 and Ser. No. 668,748.

As described in more detail below, disc 20 is provided with either or both of two track formats. One format comprises concentric tracks such as the tracks 20A and 20B. The other format comprises spiral tracks 20D from a starting point 20C to an ending point 20E. Assuming that the spiral track is to be recorded on a radially inward basis, the recording transducer is arranged to start ablations at point 20C as synchronized or coordinated with any suitable starting reference or index marker as indicated, for example, by a reference mark along line 21 suitably applied to the disc or turntable. The transducer for recording the data or information on the storage disc medium may be a laser arranged to remove the material corresponding to data or bits of information by ablation. An arrangement for synchronizing a reference on the disc is described in the above-identified U.S. patent application of A. Goldschmidt.

The concentric rings such as 20A and 20B are used preferably to record, for example, a block of information such as a single frame of a television signal. Such a recordation and the playback for the same shall be designated the "still" or "slide" mode. The frame comprises two separate fields of the conventional interlaced scanned video picture. The recording rate and the playback rate of the disc operates at a one thirtieth of a second period based on a 1800 RPM rotation rate of the disc defining thereby a time of rotation of the disc for a single frame of television picture information. (For the PAL-B, or SECAM systems, the rate is 1/25th of sec for 1500 RPM). The television signal comprises not only information of the video aspects of this signal but also blanking interval signals and other signals usually included in a television signal. In accordance with the present invention, the television signal includes within the vertical blanking interval address codes in suitable digital format to identify the location of each field of each video picture frame encoded on the disc for subsequent retrieval purposes.

The continuous spiral track starting at 20C serves as the medium for continuous action of video information. Such a mode shall be designated the "movie" mode, each revolution representing one frame (two fields) of the video picture information. The retrace interval signals and address codes or the like are preferably located within the portions 21 of each of the spiral and concentric tracks. Portion 21A contains odd field address codes while portion 21B contains even field address codes.

Figure 2:
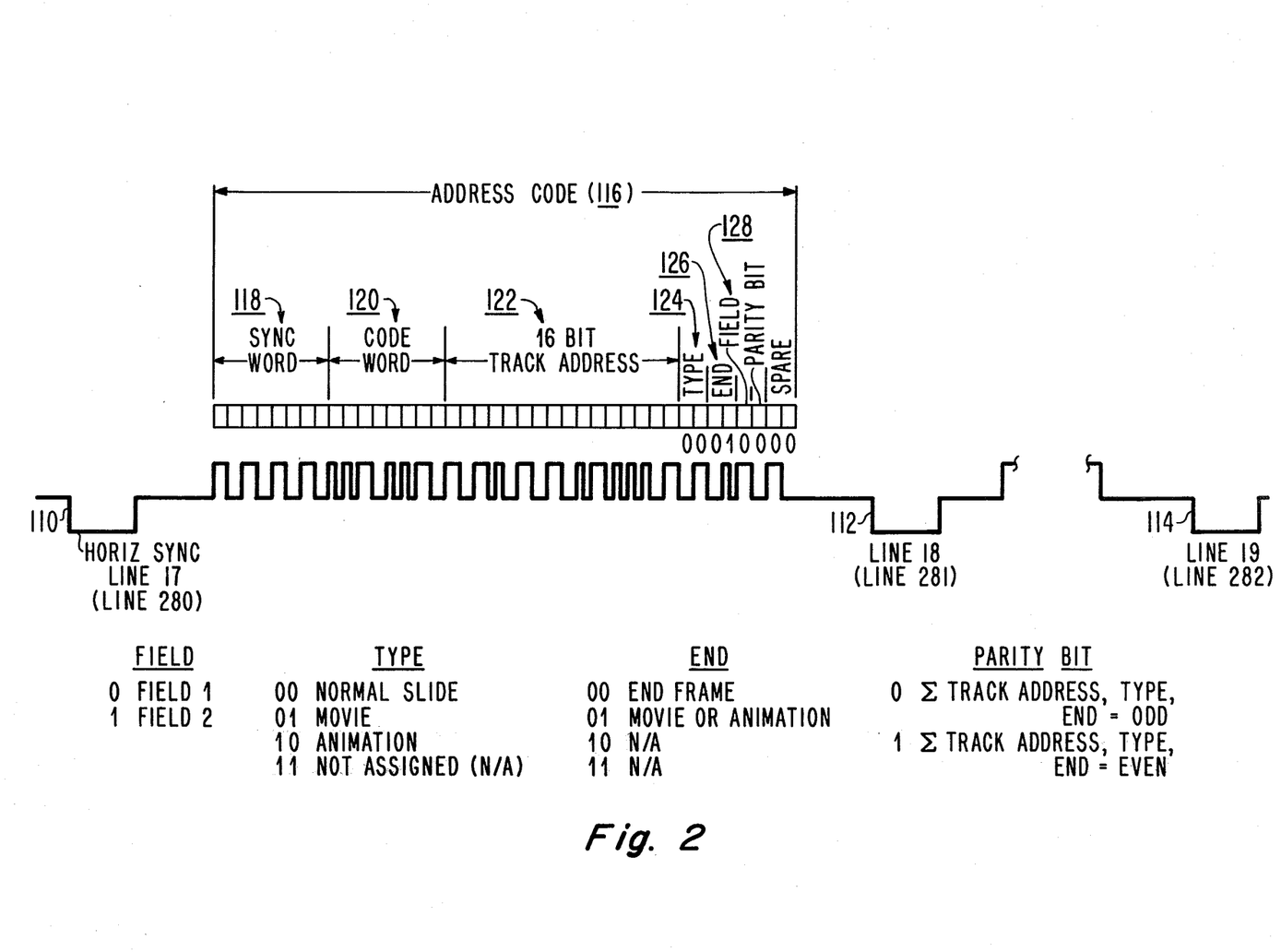
FIG. 2 is a representation of a recorded signal comprising an address code used to identify a particular track.

Referring now to FIG. 2, there is illustrated the form of the address codes included in a portion of the two vertical blanking intervals of a conventional video signal. The address codes are suitably formatted with self-clocking transitions as shown in FIG. 2.

Immediately following the typical post equalizing pulse interval, there is a first interval that spans a period of time following the final post equalizing pulse between the next horizontal sync pulse 110 and the following horizontal sync pulse 112, and a second interval between horizontal sync pulse 112 and sync pulse 114. In these two intervals, the horizontal sync pulses occur with periods of typically for NTSC 63.5 microseconds each. These particular intervals are well suited for the insertion of the address code data identified by reference numeral 116. In the standard NTSC video signal, the two intervals between lines 17 and 18 then lines 18 and 19 are used for locating the address code for the odd field of each frame and similarly the Fox, et al. application. and 282 are used for locating address codes for the even field of each frame.

Four identical track address codes 122 are provided in the composite video signal that is to be recorded, in a manner as will be described, to improve accuracy by redundancy. Suitably decoding techniques may then be used such as majority logic or the like.

Each address code 116 includes "decoder get ready" portions comprising sync word 118 and code word 120 which together serve to enable the track number decoder (156). The track address 122 comprises 16 bits, to provide for a maximum of 65,535 tracks. The "type" portion 124 of two bits designates whether the tracks are to be for the "slide" (concentric) type, the "movie" (spiral) type, or other uses, for example, "animation." The "END" portion 126 of two bits indicates the end of the track address followed by the single bit "FIELD" portion 128 which indicates the ODD or EVEN field of the frame followed by a parity bit for bit checking purposes. The table at the bottom of FIG. 2 indicates the binary bits assigned for several designations.

Figure 3A:
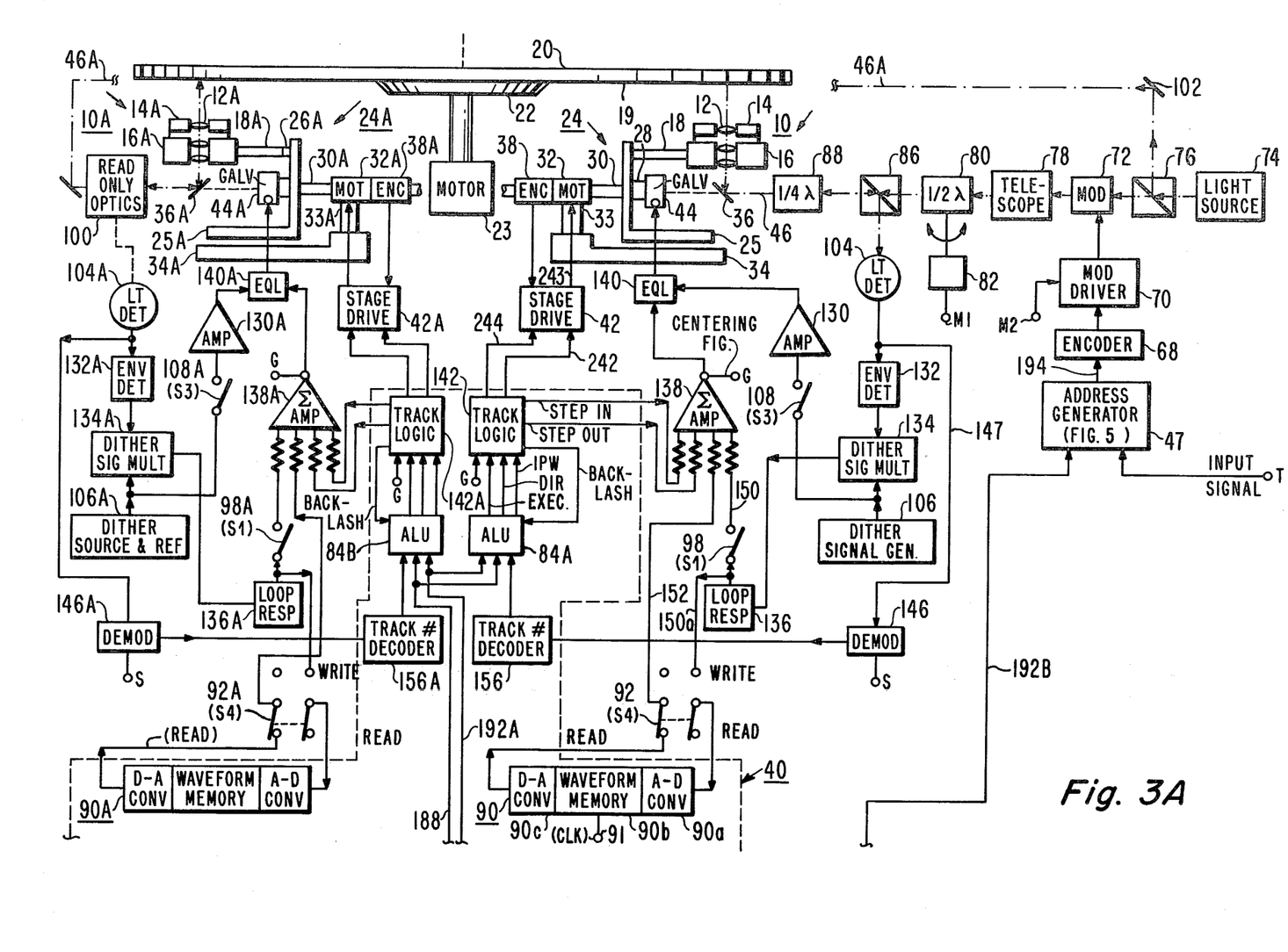
FIGS. 3A and 3B comprise a block diagram of the recording and playback system.
Figure 3B:
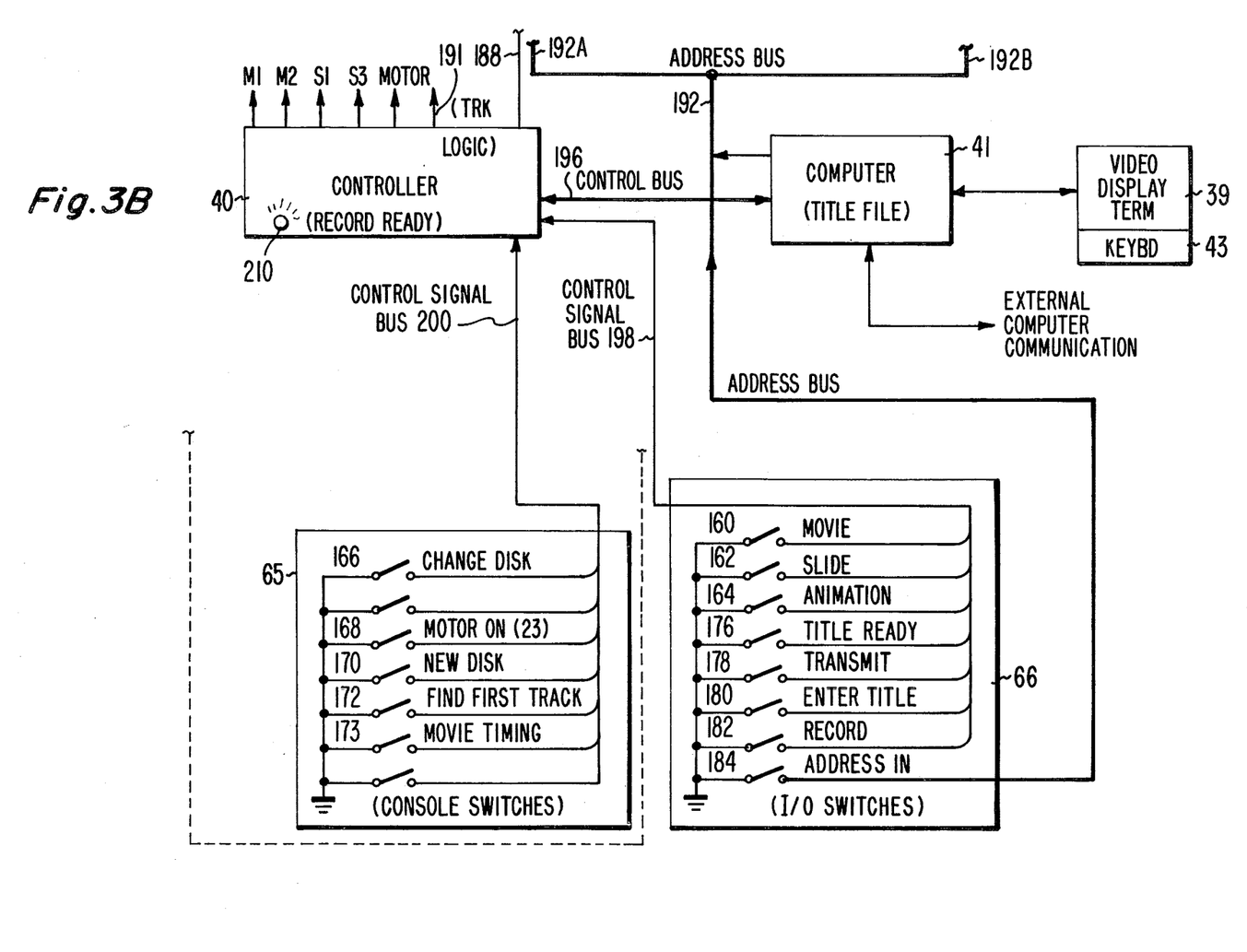

Referring now to FIGS. 3A and 3B, there is illustrated in block diagram form, a record and playback apparatus according to the invention suitable for use in studio broadcast applications. This apparatus may be used to achieve high density storage of video information in a continuous spiral track format for motion pictures or a concentric track format for still pictures. This apparatus also provides random retrieval means of the storage data in response to address commands indicative of the frame number. Further, the apparatus allows for piecemeal recording of information in the information track region of the optical disc record even though the recording sequence may have been interrupted and despite the fact the disc record may have been removed from the turntable of the recording apparatus disturbing thereby the proper alignment of the objective lens or other forms of transducers relative to the disc record surface prior to the resumption of the recording sequence.

Program information may be stored in the light sensitive regions of the optical disc 20 as an elongated information track comprising, illustratively depressed areas of a given width, a given depth, and a variable length alternating along the length of the track with relative non-depressed areas. The spatial variations of the length of the depressed areas correspond to the temporal variation of the modulated video signal employed to convey the source program information.

The playback and recording apparatus to be described may be operated in several modes. In general there is a plurality of recording modes and another plurality of playback modes depending upon the application to which the system or apparatus is being used. In general, recordings can be made for (1) continuous action movies of desired length and (2) slides on one or more tracks. Furthermore, the movies and slides can be recorded on a disc that has already been partly recorded. Such subsequent or multiple session recordings are termed piecemeal. The playback modes provide for movies, slides, animation and random access searching. Furthermore, the record and playback apparatus includes auxiliary record modes to provide back-lash washout of the stage transport mechanism 24 and 24A of FIG. 3A and an iterative search of a desired track location to achieve the recording and playback modes.

More specifically, in the continuous "movie" mode, a read/write transducer (10) is preferably positioned at the start of the outermost portion of the light sensitive region of the disc, for example, at point 20C of FIG. 1. Video information in suitable electronic signal form that is to be recorded is coupled into the system and converted to light signals by suitable transducer means. These light signals are used to effect ablations of the surface of the video disc in various track regions in response to the information of the video signal. The movie mode is on a continuous basis, the transducer being accurately guided to effect the spiral track 20D (FIG. 1) with a given pitch, preferably 2.5 microns until the recording has been completed, utilizing as much of the surface of the disc as required. This mode of operation is simply a continuous recording mode and is of the type usually performed in broadcast studio work. When the recorded movie is played back by this apparatus, a continuous motion picture will be realized.

Piecemeal movie modes allow for a recording of a movie that is completed or interrupted before the entire disc surface is used. A subsequent recording can be made just following the previous recording. If desired, the following movie mode can start at the end of the last spiral without an apparent discontinuity.

A "continuous" slide (still) frame mode is provided by this apparatus by forming concentric tracks such as 20A or 20B of FIG. 1 wherein each track contains encoded data representative of an independent and complete picture frame. During playback, a read transducer is located at the appropriate track location to effect continuously repeats of the read outs of that particular frame for a period of time, illustratively 60 seconds, to cause a stationary or still frame picture of the video data to be displayed on a monitor or a receiver that is suitably coupled to this apparatus.

In an animation mode, concentric tracks containing video data of distinct and independent picture frame information are formed in a particular track sequence format such that, during playback of the information at any suitable rate, the independent stationary frames of information contained in each concentric track will combine to form animated scenes by stepping from track to track, and appear as sequences of motion picture slides so well illustrated by the well known motion picture cartoons.

Each of the above modes, i.e., continuous movie, slide, or animation modes may also be provided by a piecemeal recording process wherein source data is recorded on the same disc in more than one recording session. The piecemeal recording capability is needed in situations where the registration between the transducer and the last recorded track on the disc has become disturbed and cannot be readily re-established. Such misregistrations do occur in situations, for example wherein a disc, upon once being removed from its turntable, cannot be accurately returned to the turntable in the precise position it occupied prior to the disc removal. The variations in manufacturing practices for making disc and turntable spindles cause, in many cases, out-of-roundness, i.e., eccentricity between the disc and turntable spindle due to differences in mechanical tolerances.

To compensate and correct for such eccentricities, the playback and record apparatus of this invention incorporates means for compensating for eccentricity errors or other errors affecting centering of the disc. Thus, the apparatus makes piecemeal recordings with very small track spacings that are even less than possible variations caused by eccentricity errors. In the piecemeal recording mode, an auxiliary mode is provided to locate the last frame recorded on the disc and to remove the back-lash in the transducer's transport mechanism. These auxiliary operations are preferably computer controlled and are suitably initiated automatically by a command to the computer to locate a track, advantageously, for recording modes.

The manner in which these modes are achieved will be understood by the description following of the components and the organization thereof as illustrated in FIGS. 3A and 3B. To provide the optical scanning, optical transducer 10 is kept stationary or moved radially across disc 20 by a transporting means termed herein, stage 24, at a rate in accordance with the requirements of the desired recording or playback mode, i.e., movie, slides or animation, while disc 20 is rotated on turntable 22 by motor 23. Stage 24 comprises conventional components including a stage carriage 25, carrying mounting members 18 and 28 on carriage 25 for supporting transducer 10 and galvanometer 44 for controlling mirror 36, respectively. Stage 24 further includes a support 34 carrying a motor mount 33 for supporting coarse tracking motor 32. A bearing of carriage 25 is in mesh engagement with a feed screw 30 adapted to be rotated in response to rotations of the shaft of motor 32. A conventional encoder 38 is coupled in a servo loop with motor 33 to provide location data of the carriage and, thus, of transducer 10. When motor 32 is activated and its shaft is rotated in, for example, a clockwise direction, feed screw 30 will cause carriage 25 to move radially inward towards the center axis of turntable 22. Furthermore, if the shaft of motor 32 is made to rotate in a counterclockwise direction, the carriage 25 will move radially outward. Carriage 25 is moved at several different rates of speed during the various modes of operation. For example, during a "movie" mode, carriage 25 is moved at a rate of 0.076 mm/sec and during a (fast) "search" mode, 76 mm/sec until the carriage 25 is within the vicinity (for example, ten tracks) of the selected track. The movements of carriage 25 are termed "coarse" tracking movements that result in moving transducer 10 to within one track of the desired track location while the "fine" tracking movements are achieved by deflecting the light scan beam exactly to the desired track by a conventional galvanometer controlled mirror 36.

Galvanometer controlled mirror 36 is displaceable about an axis that is parallel to the surface of mirror 36 for deflecting an impinging light beam in light path 46 onto the surface of disc 20 so that a light spot that is formed may be guided or tracked along a selected path on disc 20. Mirror 36 is actuated by galvo 44 that responds to analog or digital step controls for pivoting mirror 36 over a range of ±15 tracks. Galvanometer 44 is mounted to carriage 25 and receives control signals from a controller 40 and from a galvanometer error servo loop via path 150 as will be described.

Transducer 10 on carriage 25 comprises objective lens elements 12, a known capacitance-type distance sensor 14 (for sensing the distance between the surface 19 of disc 20 and the proximate end of lens 12) and a known position actuator 16 of the voice-coil type (for controlling the position of lens 12 so that lens 12 is kept in focus relative to the surface 19 of disc 20). Actuator 16 is resiliently suspended from permanent magnetic member 18 which is attached to mounting member 25. A preferred capacitance distance sensor 14 is disclosed in the above-identified U.S. application of W. E. Barnette and F. W. Spong entitled "Capacitance Distance Sensor Apparatus."

A preferred position actuator circuit including an actuator 16 is described in the above-identified U.S. application Ser. No. 777,477. Sensor 14, it should be understood is part of a suitable position control servo loop that includes actuator 16 as the controlled element. With the incident light path 46 in a plane parallel with the surface of disc 20, mirror 36 causes the impinging light to deflect approximately 90° (± 15 tracks) in a perpendicular direction towards objective lens elements 12. In playback, light reflected from the surface of disc 20 travels through objective lens 12 and is deflected by mirror 36 along beam path 46. It is noted that the length of light path between mirror 36 and disc 20 is substantially fixed while the length of light path between mirror 36 and wave plate 88 varies as carriage 25 moves.

For playback of information recorded on disc 20, the record (write) and playback (read) transducer 10 or a playback only transducer 10A may be used. Transducer 10A is located conveniently spaced from the location of transducer 10. Transducer 10A may be identical to transducer 10 in the record and playback functions and can function in like manner if desired. However, transducer 10A is used in this embodiment for playback only whereas transducer 10 is utilized both for recording and playback. Transducer 10A is also mounted on a second stage 24A that is similar in structure and function as stage 24. In addition to moving transducer 10A, stage 24A also moves a second galvanometer controlled mirror 36A and a second galvanometer 44A that are respectively similar in structure and function as the corresponding ones mounted on stage 24. A read/write transducer 10 and read only transducer 10A are exemplary. If desired, only one or additional transducers may be provided on the same turntable to provide for simultaneous record and/or playback operations on the same disc.

A light source 74, suitably an argon laser type, emits a beam of coherent light at a wavelength of approximately 488 nanometers. A beam splitter 76 provides light directly for the first transducer 10 and by reflection for the additional transducer 10A through light path 46A via mirror 102. The direct light beam passes through a suitable optical modulator 72, a telescope 78, for expanding the linearly polarized light beam, and a mechanically-controlled half-wave plate 80 under control of a solenoid 82 responsive to control signals at terminal M1. The light beam is thereby controlled by changing the polarization to achieve one level of intensity for recording signals by ablation of the surface of disc 20 or to achieve another level providing a light signal of less intensity for playback purposes. The light continues directly through splitter 86 to a quarter wave plate 88 which changes the light from a linearly polarized state to a right circularly polarized state. The light passes from plate 88 and is reflected by galvanometer controlled mirror 36 through the lens elements 12 and onto the surface of the disc 20. The focus position of lens system 12 is controlled by the capacitance sensing probe 14 in a conventional manner. The light beam striking the surface of disc 20 causes ablation of the surface material when the beam is controlled for the high intensity level. The ablation action responsive to the modulation of the beam will provide depressed and nondepressed areas that provide reflective and nonreflective surfaces for the beam. These surfaces provide correspondence with modulations of the laser beam by the information of the modulating signal at modulator 72 as will be described further.

The polarized beam splitter 86 serves to pass the beam directly towards the galvanometer mirror 36 for both the record and playback operations and also serves to reflect the returned reflected beam to a light detector 104 serving, in the playback modes, as will be explained, to detect modulations and thus the information thereon of a laser beam that has been on playback reflected from the surface of the disc 20. Light detector 104, preferably an avalanche photo-diode, converts the impinging light into an electrical signal that is coupled to an envelope detector 132 and to a demodulator 146. The envelope detector (132) output is coupled to a dither signal multiplier 134 (preferably a synchronous detector) which in response to a dither (reference) signal generator 106 provides a signal to a loop response network 136, typically a low pass network, to allow only low frequency signals representing the error signals used to keep the playback transducer centered on track to pass in the loop as will be explained. Network 136 is coupled through a switch (S1) 98 which when closed couples the servo loop signals in path 150 through an input resistor to summing amplifier 138 and then to servo loop equalizer network 140 which, in turn, is coupled to a galvanometer 44 which controls the pivoting of mirror 36. The galvanometer servo loop 150 is coupled from the S1 switch to a double-pole double-throw manually operable switch (S4) 92. Switch (S4) in the "write" position provides a path to a waveform memory 90 comprising an A/D converter 90a, which is coupled to a memory 90b suitably a RAM and a D/A converter 90c. A clock source via terminal 91 is coupled to the waveform memory 90b to provide clocking at the turntable rate at which the signals from A/D converter 90a are received and stored and read out via D/A converter 90c. Memory 90 thus serves as a means to store the waveform that is coupled to it via switch 92 in the write position. This signal that is stored is essentially the "signature" of the disc based on the unique contour of a track manifested by a playback signal of that track on disc 20 as will be explained. When the signature stored in memory 90 is to be read, switch S4 is manually positioned to the read position as shown coupling the signature signal by path 152 through the input resistor coupled to summing amplifier 138 and thence to equalizer 140.

Switches S1 and S3 are manually or automatically operated by controller 41. Switch S4 is controlled manually only and is normally in the "read" position except during the recording of the reference track as will be explained in detail.

Reverting to the description of the playback detecting structure, signal path 147 from light detector 104 couples the detected signals to a demodulator 146 which demodulates the signal information into the analog form (of the input signal at terminal T) that was originally recorded and subsequently played back from the disc 20. The demodulated video signal is available at terminal S for use as required in the broadcast facilities, for example, using the tracking apparatus of the present invention. The demodulated signal is additionally coupled to a track number decoder 156 which extracts from the signal the track number in response to the address code 116 that is provided in the information signal as described above. A signal corresponding to the track number is coupled into an ALU (arithmetic logic unit) 84a suitably arranged to perform the calculations required to position carriage 25 and pivot mirror 36 so that the beam is directed to the proper track position on the surface of the disc for both recording and playback. ALU 84a is provided with buffers to store binary words corresponding to the present and desired (commanded) track numbers. ALU in response to the track number inputs (decoder 156 and address inputs from the command keyboard 43) generates binary control words that are passed to track logic 142. Track logic 142 is formed of suitably logic elements to respond to the ALU control words viz., incremental position words (IPW), direction (DIR) and execute (EXEC) to generate suitable control voltages to operate the motor stage drive 42 and the galvo 44. Signals for controlling the speed of the motor 32 are coupled over path 242 and thence to path 243 to operate motor 32. Control signals for the direction of the motor are provided over path 244. The position of the motor as manifested by the output of encoder 38 is coupled back to stage drive 42 to provide servo control information signals to energize or deenergize the motor to satisfy the original command. For IPW that represent four or less tracks, track logic 142 is arranged to pivot the mirror 36 alone without moving the carriage 25. Thus, for four or less tracks, single pivotal steps or movements of the mirror are provided by the track logic over the "step in" and "step out" signal paths through input resistors to the summing amplifier 138. The signals proportional to the track steps required are passed through these paths to cause the galvanometer 44 to position the mirror 36 accordingly.

Referring back to the dither generator 106, the signal from that reference source not only is coupled to multiplier 134 but is also coupled through a switch (S3) 108 that when closed provides an input to amplifier 130 which, in turn, is coupled to equalizer 140. Equalizer 140, mentioned above, is a suitable impedance matching network coupling the amplifiers to the galvo 44. Modulator driver 70 is provided with a recording bias control via terminal M2 which causes modulator 72 to either be in an ON or OFF state corresponding to the binary encoded ON or OFF states via driver 70, encoder 68 from terminal T. Modulator 72 is normally steady-state biased for the playback mode.

In addition, a signal M1 from controller 40 energizes solenoid 82 which in turn repositions the plate of device 80 to reorient the laser (light) beam from the record to playback mode. In the record mode the beam is modulated via a modulation driver 70 which, in turn, is provided with digital data that has been generated by encoder 68 of the input signal (or source information) at terminal T.

Source input signal information, illustratively, a video signal comprising frames of information that may be composed of slides or motion picture data providing a new image on every other horizontal line, 60 times a second for each odd and even field to form a video frame, is coupled into the record apparatus of this invention for processing and recording through input terminal "T." This composite signal is illustratively the NTSC 525 line, 60-field TV signal comprising a sync pulse structure of vertical and horizontal sync pulses as shown in FIG. 2 for the purposes of synchronizing the TV signal processing circuits and the TV picture monitor circuits to the scan frequency fo the TV signal source (i.e., TV camera, video tape system, etc.). However, this apparatus is applicable to other video standards such as PAL-B and SECAM.

GENERATING ADDRESS CODE

The information signal that is to be recorded on the disc 20 is provided with a suitable address such as the address code 116 (FIG. 2) as described above. This address code is mixed with the input signal from terminal T at the address generator 47. A suitable address generator 47 is shown in block diagram form in FIG. 5 to be described. The track number (122) of the address code 116 is generated by the equipment illustrated in FIG. 3B and the generated signals are coupled both to address generator 47 via path 192B and ALU 84A via path 192A.

The various modes and control operations are initiated by the operation of switches or buttons as grouped in the console 65 and the I/O switches 66 of FIG. 3B. The switches are shown in separate groupings for convenience representing an actual implementation of the system in which switches 65 are located near the turntable 22 while the I/O switches are located remote from the turntable but near the video display terminal 39 and keyboard 43. The switches of console 65 comprise: switch 166 when a disc is to be changed; a switch 168 used for starting turntable motor 23; switch 170 for placing a "new disc" on the turntable; and switch 172 for causing the equipment to "find (the) first track" that is to be recorded. In the I/O switch unit 66 there is provided a switch 160 for placing the system into the "movie" mode; switch 162 for placing it into the "slide" mode; switch 164 for the "animation" mode; switch 176 for the "title ready" operation; the switch 178 for transmitting the address code if desired; switch 182 for the "record" mode and thumb wheel switch 184 for the "address in" operation. Switches of console 65 provide a grounded input over control signal bus 200 to controller 40. Controller 40 is a suitable network arrangement of logic components comprising flip-flops and control gates to provide control signals to operate switches S1 and S3 and to provide control signals to the ALU 84a via path 188 and track logic via path 191 as well as operating motor 23 in response to switch 168 ("motor on"). In addition controller 40 is arranged to provide control signals M1 and M2, respectively for half wave plate 80 and driver 70 to change the system from record to playback modes.

Controller 40 is coupled to a computer 41, suitably mini-computer type SPC-16 manufactured by General Automation, Inc. Anaheim, California. Mini-computer 41 is provided with a memory to store the titles of each track of a disc. A control signal bus 198 couples the grounded signals from most of the switches of I/O switch group 66 to controller 40 and also provides the "address in" address bus 192 via paths 192A and 192B to ALU 84a and address generator 47. "Address IN" may also be provided over bus 192 by computer 41 as will be explained. Computer 41 is coupled to a suitable video display terminal 39 provided with a keyboard 43. Information required to be provided in the address 116 is generated at the keyboard 43 with suitable start and stop signals as well as a visual readout provided at the video display terminal 39 indicating the title data being provided in a conventional manner.

Figure 5:
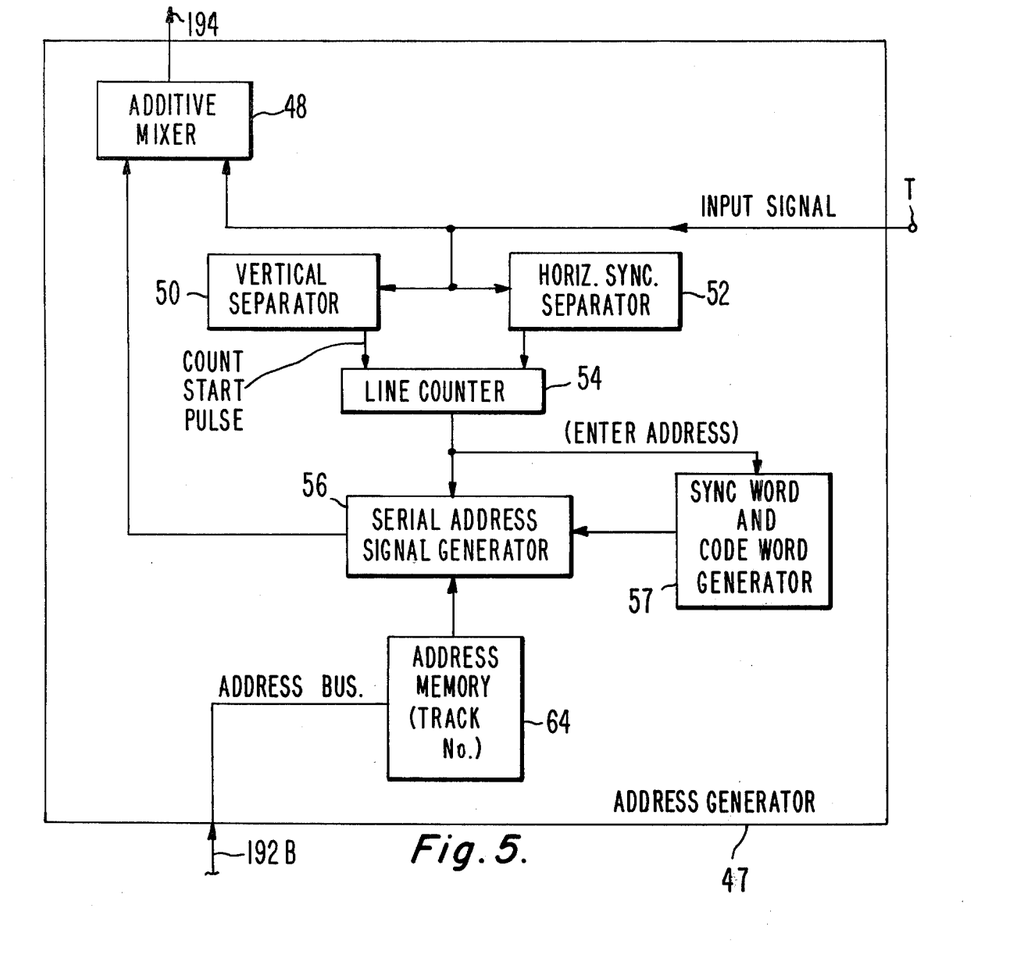
FIG. 5 is a detailed block schematic of the address generator (47) of FIG. 3A.

Refer now to FIG. 5 for the arrangement of a suitable address generator 47. In response to the input signal via terminal T, output signals of a vertical sync separator 50 and a horizontal sync separator 52, are coupled to a line counter 54. The start pulse for the line counter is based on the frame signal derived by the vertical sync separator. Line counter 54 is coupled to a serial address signal generator 56 and also to the sync word and code generator 57 which provides the sync word 118 and the code word 120 of address code 116 (FIG. 2). The serial address signal generator 56 couples the address portions from generator 57 and memory 64 to an additive mixer 48. Address memory 64 receives its address words via path 192B from computer 41 on command of the operation of the "ADDRESS IN" switch 184. On this command, the system provides an address 116 to the incoming signal via terminal T that is to be recorded on the disc 20.

The address generator 47 operates as follows. Line counter 54 receives start counter pulse from vertical sync separator 50 for every vertical sync pulse. Counter 54 then counts the horizontal sync pulses from horizontal sync separator 52 to determine, illustratively, lines 17 and 18 for the odd fields and lines 280 and 281 for the even fields. Generator 56, (typically a parallel-to-series shift register) receives an "enter address" signal from counter 54 indicative of the receipt of the desired horizontal line pules and then initiates the transfer from generator 57 and memory 64 of the address codes that are to be inserted on each of the four horizontal lines (lines 17, 18, 280, and 281). The address words that are stored in address memory 64 are entered there by either an operator that types in the specific address at a keyboard 43 or automatically by computer 41 when automatic insertion of incremented address words are desired as for a movie, animation, etc. The address words in series are coupled via generator 56 to mixer 48 wherein the address is inserted on each of the four above mentioned lines forming a new composite signal having four address codes per picture frame. This address code arrangement on these designated lines of each frame is used to facilitate "search" mode operations.

This new composite signal with address codes (116) inserted is coupled from mixer 48 via path 194 to encoder 68, wherein illustratively, the input information signal along with the digital address code is used to frequency modulate a carrier wherein it is processed into a FM modulated square wave output signal.

DITHERING FOR PLAYBACK TRACKING

Before describing the operation of the recording and playback modes, a description of dithering the tracking signal, as well as the manner of compensation for eccentricity errors, performing an iterative search and entering a title will now be detailed.

Figure 4:
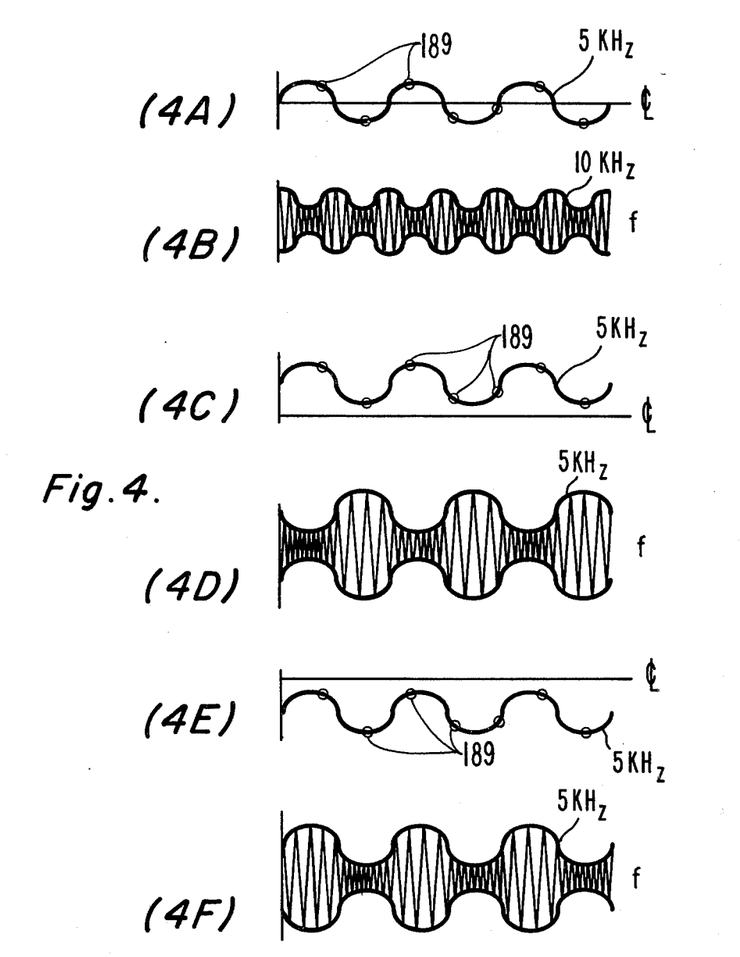
FIG. 4 including 4A through 4F is a representation of waveforms of signals used in the system illustrated in FIGS. 3A and 3B.

For locating the "read" light spot on the center of a recorded track, the galvo error servo loop 150 includes a dither circuit for developing a tracking error signal. During playback, the "read" light beam that impinges upon the track being played back is dithered periodically in a direction perpendicular to the track path. Illustratively, a five (5) KHz dither signal from dither signal generator 106 is applied when the playback mode is initiated through closed dither switch 108 (S3) to dither drive amplifier 130 and then to galvo 44 causing mirror 36 to oscillate at the five (5) KHz rate. This dithers the "read" light spot radially across the track being played back. The dithered light produces a five (5) KHz AM (amplitude modulated) signal on the envelope of the reflected light signal that appears at detector 104. The output of detector 104, an FM carrier signal enveloped by the 5 KHz dither signal, is coupled to envelope detector 132 wherein the five KHz A.M. portion of the signal is stripped from the detected signal. This stripped-off five KHz signal is coupled to dither signal multiplier 134 and compared to the reference five KHz dither signal from source 106. If the average of the dithered light spots 189 are centered on the track as shown in FIG. 4A, a 10 KHz A.M. signal results and no error signal is produced at the output of multiplier 134. See FIG. 4B in which the amplitude variations are exaggerated and also exaggerated for all waveforms of FIGS. 4B-4F. However,, if the light spots 189 are off-centered as in FIG. 4C or FIG. 4E, a five KHz signal is generated having a phase characteristic that differs from the reference dither signal as shown in either FIGS. 4D or 4F, respectively. These phase differences are sensed by multiplier 134 (a synchronous detector) to derive an error signal that is modified appropriately by loop response network 136, suitably a low pass filter, to eliminate the high frequency components. Thus, only the light spot tracking error (FIG. 6) is applied to galvo 44 via closed galvo error loop switch 98 (S1) and servo amplifier 138 to control mirror 36 so that the light spot path tends to be centered over the center of the track.

ECCENTRICITY COMPENSATION

The reference track is the first track recorded on a new disc. The reference track serves as a source of a signature of the disc for controlling the contour of all the tracks that are to be recorded on that disc whether on a continuous or a piecemeal basis. Prior to "reading" the reference track to determine the disc signature, waveform memory switch 92 (S4) is manually operated to the "write" position. This will allow a signal of the signature to be stored in memory 90.

The signal recorded on the reference track, may be of any form including the typical "color bars." The signal on the reference track is "read" and detected to provide the "signature."

Switch S1 of the galvo servo loop is closed and switch S3 for providing a dither signal is closed. The playback mode is initiated (as will be further detailed below) so that the reference track can be read.

Figure 6:
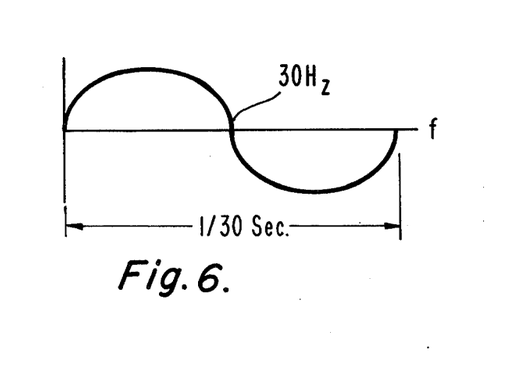
FIG. 6 is a plot of a signal waveform representing the eccentricity or signature of a recorded track.

The signature waveform illustratively shown in FIG. 6 will differ for each disc and may be different for the same disc if the physical shape or track position profile of the information track region is physically distorted or altered radially by warping or by bending. Thermal changes can cause such effects. The signal from network 136 is coupled to A/D converter 90a and stored in waveform memory 90b in a sequence controlled by clock signals at terminal 91 of memory 90b, illustratively, of 30 Hz corresponding to the speed of rotation of turntable 22 (25 Hz for PAL-B and SECAM). This stored data is used to control galvo 44 in the galvo error loop 150 to control mirror 36 for all subsequent recording whether piecemeal or continuous. If desired, at any time, the signature waveform may be read and re-recorded into memory 90 by simply reading the reference track in the manner described, or any other recorded track.

After storage of the signature of the reference track in memory 90 the system is reverted back to a condition to make further recordings. Thus, galvo error loop switch 98 (S1) is opened, dither switch (S3) 108 is opened and waveform memory switch 92 (S4) is positioned in the read position. Switches S1 and S3 may be closed manually or under commands of controller 40 and computer 41 in accordance with the mode desired.

ITERATIVE SEARCHING

In order to playback information from the disc, it is required that the track from which the playback is to be made must be located. Accordingly, a search mode is provided to locate any track desired. In certain modes of the system, the search for a track is automatic, for example, in order to determine the first track upon which the reference track is to be recorded. That search mode is provided once the procedure has been initiated by operating the "find first track" switch 172 of the switch console 65. In order to start a recording on a piecemeal basis, it is required that the last track be located. The manner in which the searching mode is performed is in general as follows. The track to be searched or the first track of a sequence of tracks to be searched is determined by the operation of the "address in" switch 184 of the switch group 66. The operation of the switch 184 provides a command to ALU 84A as well as computer 41 via address bus 192. The ALU receiving such a command to find a new track will compare in its buffers the new track command with the track number of where the transducer 10 is presently located as stored from the last playback. ALU 84A generates a signal representing the difference of the command address to the present address position which will be the IPW signal. This signal word can be an amount of 1 to 50,000 tracks, and will cause the stage drive 42 to activate the motor 33 for track movements greater than four and open loop switch 98. For refined movements of four or less, switch 98 is closed causing accumulated "step in" or "step out" movements, of mirror 36 by as much as four tracks. The track logic 142 is arranged as indicated above to provide these "step in" and "step out" movements preferably within four tracks in closed loop 150, although larger quantities may be used if desired. Thus, when motor 33 is driven by the IPW word it will stop under control of controller 40 at the commanded address. In this commanded position, the transducer will read back into track decoder 156. This number is coupled to ALU 84A. If the track number is different from the commanded number, then the ALU will generate another IPW signal to effect further movement of the carriage 25 or mirror 36 to a location in the direction and track quantity corresponding to the difference. When the difference in the ALU is zero indicating arrival at the command position, then the desired track will have been determined. Appropriate signals are provided to controller 40 via the ALU bus 188 indicating that the track searched has been found.

ENTERING TITLES

In order to enter the title of the track or series of track to be recorded, the I/O switch 180(FIG. 3B) entitled "enter title" is used. Switch 180 closed sends a signal over bus 198 to controller 40 which generates a request signal to computer 41 to indicate that a title is to be provided for the next recording. Computer 41 enables video display 39 to display a suitable request from the operator to provide any common or arbitrary name associated with the next track to be recorded. The title or name is entered by keyboard 43 and coupled back to computer 41, which, in turn, provides a track address number via bus 192 to both ALU 84A and the address generator 47.

RECORDING A REFERENCE TRACK

The operation of the apparatus for recording a reference track will be illustrative of many of its operating capabilities and features. At the start the "heads" comprising transducers 10, 10a, etc., are in the outward position to allow placement of disc 20 on turntable 22. Motor 23 is stopped and the laser light source 74 is in the playback light level. A new disc 20 is positioned on the turntable 22 and motor 23 is operated by switch 168 (console 65) to rotate the disc. The "new disc" switch 170 is operated preparing controller 40 for the next step which is to address the title file in the memory of computer 41. Computer 41 in response to this request via bus paths 200 and 196 unloads its previous disc file memory into a permanent bulk file. The memory of computer 41 may then be used for the new disc. The memory of the computer 41 is a title file relating each track number in sequence to a desired title such as movie "A" or slide "B" or x-ray "C", etc. Upon completion of this bulk title transfer operation computer 41 provides a signal to video display terminal 39 to indicate to the operator to perform the next step. The next step is the operation of switch 172 which commands to "find (the) first track." Controller 40 responds to provide a signal to the ALU 84A to send a predetermined incremental word signal of movement (IPW) typically a value of 3 cm. Transducer 10 is thus moved by carriage 25 on base 34 by motor 33 responding to track logic 142 signals to a predetermined inward position that corresponds to the first track on the disc 20.

Dither switch (S3) 108 and galvo loop switch (S1) 98 are opened. Switch S4 is in the write position and thereby its "read" path is opened. This is done to prevent addressing signals into waveform memory 90 during the recording of the reference track. Galvanometer 44 is operated as by a manual control not shown to position mirror 36 in its neutral or central position whereby beam 46 is reflected to be directly perpendicular to the surface of disc 20. Since switch 98 is opened, no "stepping in" and "stepping out" from signals track logic 142 will be generated.

The focusing mechanism for the lens 12 is suitably enabled, the details of which are not shown or described herein as previously indicated.

Next the "enter title" switch 180 is operated and the type of recording that is being made is selected as by any of switches 160, 162, and 164. For the present operation of recording a reference track, a slide mode is used to generate a concentric track such as 20A (FIG. 1). Thus for the slide mode, switch 162 conditions motor 33 to be inoperative allowing the stage to remain fixed during the rotation of disc 20 and galvanometer 44 as indicated above, is rendered inoperative leaving mirror 36 in its fixed, neutral position.

"Enter title" switch 180 closed, conditions computer 41 via bus 198 and 196 to receive the title information that is to be stored in the title file corresponding to the tracks into which the information is to be recorded. Thus, computer 41 instructs the video terminal 39 and keyboard 43 to provide input information corresponding to the title for the first track, namely, track number 1. For example, the title that would be typed into keyboard 43 could be simply "reference track" or alternatively "color bars." "Color bars" signals are commonly used as reference signals in television systems for adjustment purposes.

After the information for the title has been entered in the keyboard and has been stored in the memory of computer 41, a conventional carriage return button is energized by the operator. The computer responds once the memory has been stored to indicate the title is ready and a "title ready" switch in the computer is effectively closed. It is noted that the computer generated "title ready" switch signal is the equivalent of the manual operation of switch 176 indicating that the title is ready and the system is ready to record the track.

The control signals on bus 198 are generated by the associated switches of switch group 66. These control signals are effectively duplicated by suitably programming of the computer over control bus 196. It is noted that the switches of group 65 are exclusively manually operable as previously explained.

Computer 41 in the meantime generates a binary signal or address corresponding to the track number that is to be recorded. In this instance the binary value for track no. 1 (for address 122 of address code 116, FIG. 2) is generated and passed by address bus 192 to both the address memory 64 of address generator 47 (FIG. 5) and well as ALU 84A. With respect to address code 116, it will be noted that the "type" of the recording, namely the portion 124, is generated by controller 40 in response to the operation of switch 162. The sync word 118 and the code word 120 are generated by address generator 47, particularly, generator 57. These code words are essentially a "decoder get ready" type of signal to enable the track decoder 156 to anticipate and then decode the demodulated signal carrying the address code 116 at lines 17, 18, 280, and 281 of the NTSC television signal. The "end" portion 126 of address code 116 indicating the end of the frame is provided by the controller 40 and the address generator 47 at the end of the frame. The "field" 128 whether it be odd or even is generated by the address generator 47 whereby the address code for the odd and even fields (21a and 21b FIG. 1) are synchronized with their relative locations on the disc. The parity bit is likewise generated by the address generator 47 in a suitable manner.

Upon the operation of switch 182, indicating a command to the system to "record" the following operations are performed. The light level from the laser from source 74 is increased for the recording mode by rotating plate 80 via terminal M1 of solenoid 82 from controller 40. Similary, the bias for the modulator 72 is generated by controller 40 via path M2. The signal to be recorded on the disc for the reference track is then coupled through terminal T. This signal may be from a suitable test signal generator that provides a suitable "color bar" or "color black" signal wherein there is no video information, although sync pulses or sub-carrier color bursts may be provided as well known in the art. Similar test signal generators are useful for both the NTSC and as well as the PAL-B type of television signal systems. As the signal is received via terminal T, the address code 116 is provided for both the 17th and 18th line in duplicate for the odd fields and on lines 280 and 281 for the even fields. At the same time that the address is coupled to address generator 47, it is also coupled via bus 192A to the ALU 84A, particularly the buffer thereof for storing the address code for use subsequently for searching.

At the end of a single revolution of disc 20, the recording of the reference track has been completed. A suitable timing signal, for example, is provided by the controller 40 indicating the end of the recording of the reference track. Upon the generation of such a signal, controller 40 is arranged to terminate the "record" switch (182) via computer 41 as well as terminating the "new disc" signal (170). The controller further provides for an automatic return of the apparatus to its playback mode. This playback mode operation, thus, causes modulator 72 via its bias control M2 to be biased in the playback level of intensity and plate 80 is likewise placed in the playback mode via its terminal M1.

The reference track is now read to determine its signature and to store a signal corresponding to that signature for immediate future recording of subsequent tracks. Accordingly, switches S1 and S3 are closed manually or by suitable computer programming. Switch S4 is positioned in the write position. Thus, the galvanometer servo loop is closed. In addition, the "slide" mode switch 162 for playback is energized. In the meantime, it will be noted, the disc is kept in continuous rotating action. Unless there is a reason to remove the disc from the turntable 22 it will be continuously rotated.

During this playback mode the optical signals reflected from the recorded track will be passed after detection through path 147 to the system output terminal S and also to track decoder 156. The IPW signal word will be zero since the value of the track number derived by the decoder in the ALU buffer is 1 and the command signal calling for the playback of the first track, results in a ALU computation of zero. Thus, no track movement commands will be executed leaving the transducer in the position of track number one. The envelope detector 132 at the same time will sense variations of the playback signal due to dithering effected by the closure of the dither loop via the closed switch S3. The stripped envelope of the signal is multiplied with the reference dither signal in multiplier 134 to develop the galvo servo signal which is then coupled through response network 136 to operate galvanometer 44 and thus mirror 36. Mirror 36 thus causes the beam to track the reference track as galvanometer servo loop keeps mirror 36 in the tracking position. With the galvanometer loop in the closed loop servo operation for tracking, the signature signal from the loop response network 136 is coupled over path 150a through the S4 switch closed and into the A/D converter 90a. The waveform memory 90b receives the digital form of the signature at a clock rate determined by the clock coupled to 91, in this instance, at a 30 Hz rate equivalent to the turntable rate. The signal as now stored in memory 90b is ready to be used to control the mirror 36 for all subsequent recordings so that the tracks for subsequent recordings will follow the contour of the reference track.

RECORDING INFORMATION TRACKS

Track number two may be recorded with information immediately after the recording of the reference track and storing of its signature. Furthermore, track number two may be recorded at some subsequent time after the disc 20 may have been removed from the turntable and returned. Assuming that the track number two is now to be recorded, the "enter title" switch 180 is operated to enter the title for the second track. Thus, the title is entered via keyboard 43 in the manner previously described to identify by name the track number two whether it be for the single frame of information or the start of a movie sequence or animated slide sequence, etc.

Computer 41 in response to the "enter title" switch 180 and the subsequent entry of the title by keyboard 43 sends the track number of the last recorded track in digital encoded form to ALU 84a via address bus 192A. In addition, the "title ready" signal, equivalent to switch 176, is sent to controller 40 via control bus 196. Further, an execute signal via the control bus 188 is applied to ALU 84a to provide a signal to find the commanded track specified by the computer. Thus, the address of track number one (the last track recorded) is sent to ALU 84a. Since the ALU's present track buffer memory is "one" stored from the reference track "one" being recorded and the command buffer of the last track is "one," the output of the ALU is zero and thus no iterative search is required.

Figure 7:
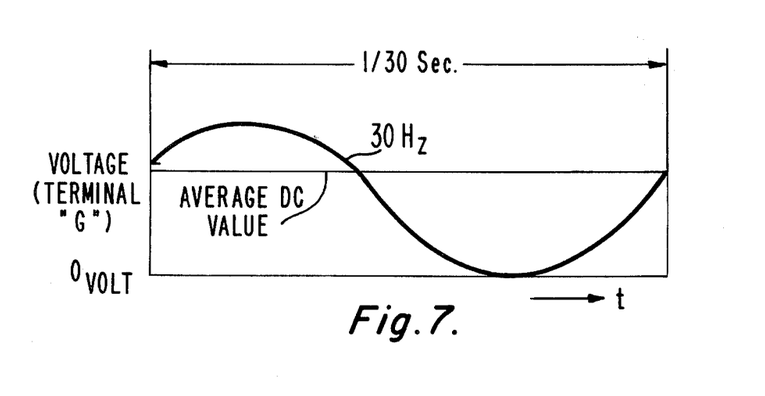
FIG. 7 is a plot of a waveform of a signal representing the back-lash washout voltage at terminal G of FIG. 3A.

The recording head is now in position to record track number two by deflecting a mirror 36 by one track, i.e., from track number one to track number two. However, in accordance with a feature of this apparatus, any residual backlash that may exist between shaft 30 and stage 25, due to the forward and backward motion of the motor, is compensated for or washed out in the following manner. Controller 40, responding to a zero error of IPW indicating that the transducer 10 is in position to record the next track, the backlash mode is initiated automatically. The track logic 142 is arranged by control lead 191 to address stage drive 42 to provide a signal to move stage 25 outwardly and also to maintain switches S1 and S3 in a closed position. As stage 25 is moved radially outward, the galvo loop 150 causes the mirror 36 to be deflected such as to keep the beam centered on track number one. As the angle of mirror 36 increases as stage 25 is moved outwardly the voltage at terminal G increases at a rate typically of 21 millivolts per track. Track logic 142 is suitably arranged to derive the average D.C. value of the signal at terminal G, as shown in FIG. 7. The average D.C. value is compared in logic 142 to a threshold value. Upon reaching the threshold value, for example, equivalent to ten tracks of movement, logic 142 generates a control signal to stage drive 42 and thence to stop and reverse motor 33 until the average D.C. voltage at terminal G is zero, indicating that the mirror 36 has been returned to a position directly over track number one.

The stage 25 during this backlash mode is moving at the rate of 0.077 millimeters per second. When the threshold value is reached indicating the movement of ten tracks outwardly as described above, the motor is reversed to drive the transducer back to the position whereby the average voltage at G is within the one track voltage value of zero. The voltage response of the galvanometer servo loop 150 is thus represented by the voltage at terminal G. The period of the voltage at terminal G is 1/30th of a second, based on the period of rotation of one track and is accordingly at 30 Hz.

After the backlash compensation mode has been completed, the ALU 84a instructs the controller 40 that the apparatus is ready for recording. The controller indicates this to the operator as by a "record ready" indicator light 210. The operator then presses the "record" switch 182. The computer 41 in response to the record switch sends out an address code of the track number to be recorded via bus 192A and 192B. In this instance the track number is two. In the general case the address code will be the address for the track that is to be recorded. The address code is then added to the input signal applied at terminal T by mixer 48 of the address generator 47 in the manner described above. ALU 84a receives the command of track number two via bus 192A and computes that an IPW of one track is required since the buffer of the previous track number one and with the command for track number two received, the ALU generates an IPW signal corresponding to one track. The IPW signal applied to track logic 142 causes the "step in" signal to be applied to servo amplifier 138 and thence to galvanometer 44 to deflect mirror 36 one step. Controller 40 causes switch S3 to open thereby preventing any dither signal to be applied to the mirror 36 and operates control signals M1 and M2 for the laser light to be placed in the record intensity mode. Then the recording is started suitably synchronized at the starting position for reference line 21 on the disc as described above. The recording continues as desired for the duration of the input signals that are to be recorded whether it be on a slide or movie basis. A slide recording is terminated at the end of one frame by controller 40. A movie is also terminated by controller 40 but under the control of movie timing switch 173 (FIG. 3B) which is suitably a group of thumb-wheel switches that may be set at any time duration from one frame to the capacity of the disc.

The embodiment described utilizes an encoder 68 to encode the analog signals applied at terminal T to digital form. Of course, if the signal that is applied at input terminal T is in suitable digital form, the encoder 68 is not required.

A recording mode can be interrupted at any time and restarted in place to continue the recording. Further a disc can be removed from the turntable and stored for use for future playback or continued recording at a subsequent session for the remainder of its recordable portions. To remove the disc, the motor 23 is stopped via switch 168, the "change disc" switch 166 is operated causing the transducers 10, 10A, etc., to be moved radially outward clear of the disc. On replacement, the disc is mounted on the turntable and the procedure for recording is continued as described above.

The operation of the various recording and playback modes such as a movie, slide, and animation will be apparent in view of the preceding descriptions. For simulating slow motion from a movie during playback, the track logic is arranged under control of the controller and suitable computer programming to cause mirror 36 to "step in" one track repeatedly and to advance to the next track and repeat the "step in" actions to thereby playback a sequence of desired frames in "slow motion." Further, instant playback of a recorded track can be accomplished while continuing the recording of the sequence, by the use of transducer 10A operated in the playback mode delayed by one track.

There is thus provided a track servo system that can optically record on a recording surface information tracks in spiral or concentric form for discs and helical or circular form for cylinders and drums. The individual tracks are provided with address indicia that are addressable for search and optical playback. The servo system controls the movement of the optical transducer so that the spacing between tracks is very small. One aspect of the system compensates for deviations in the track position profile (eccentricity errors) introduced by structural changes in the recording surface such as a disc. By such compensation recording, additional tracks on a surface that have been partly recorded is possible even with track position profile deviation errors that are greater than the spacing between the tracks. Accordingly, uniform high density recording is achieved even with piecemeal recording. Also with the tracks being evenly spaced, the time required to access a specific track is reduced by requiring a smaller number of iterations. Although the track position profile deviation compensating feature is of significant advantage for multiple session or piecemeal recording as described, it should be appreciated that the "signature" control signal derived from the reference track can also be used during the playback modes with the dithering circuit for tracking the playback track with enchanced tracking performance. This is so since the mirror 36 is controlled to follow the known track position profile deviations of the recorded track. As a consequence, the track servo loop error signal will be minimized. Further the "signature" signal can be derived from any recorded track, since the track position profile of the recorded tracks is the same as the original reference track.

By the use of a motor driven carriage for servo tracking to within one track of a desired track and a galvo-driven mirror for servo tracking to a small plurality of tracks even with the carriage stationary, rapid access to a track is achieved. This feature is utilized with track logic providing for very rapid galvo mirror tracking if the desired track is within, for example, four tracks of the carriage position. The mirror is controlled, it should be noted, in a closed servo loop whereby very rapid mirror movements are possible.

It is to be noted that the input information signals may be in analog or digital form, the address signals from address generator 47 being in digital form. Encoder 68 is thus preferably a frequency modulator. The encoder 68 thus modulates both the input information signals, such as video signals, and the digital address signals to generate variations in frequency at the information rate. The encoded signals provide the modulation rate of the recording laser beam. The optical recording on the surface effects essentially a PWM (pulse width modulated) format. The demodulator 146 frequency demodulates the playback siqnal, suitably by the use of a zero crossing detector or a frequency discriminator.

If the information signal input is in the form of digital data, an FM modulator (68) and a demodulator (146) are not needed if the bit rate is at least 50–100 kHz. This rate is needed to allow the dither signal at 5 kHz to be operative.

If the surface of a drum or a cylinder is used for the recording surface, the carriage 24 and transducer 10 will be suitably arranged to effect the recording and playback operations as described for a disc.

It is to be appreciated that while radial runouts are manifested in eccentricity errors, axial runouts are manifested over the cylinder and drum surfaces as once-around pitch variations and once-around axial runouts. However defined, any deviations in the desired track position profile of such tracks can be compensated for in the manner described above.

What is claimed is:

1. In a video disc information record and playback apparatus, for use with a source of signal information including video type frame, field and line synchronization signals, for effecting signal information recording, on a disc record medium, along spaced apart, elongated tracks, said apparatus including control means for recording said signal information at desired locations on said disc record medium and for the playback of said signal information from said desired locations; the combination comprising:

means responsive to said frame synchronization signal for generating a plurality of identical address indicating code signals corresponding to each frame of signal information, each of said frame address code signals including a timing control component, a track identification component, and an odd or even field identification component;

means for mixing the address indicating code signals from said generating means with the corresponding frame of signal information in a manner providing output signals corresponding to the insertion of one of said plurality of identical address indicating code signals in each of at least two consecutive intervals between line synchronization signals in each of the field constituents of said frame of signal information, whereby each of said field constituents of a given frame of signal information includes at least two of said identical address indicating code signals;

said control means including:

means for decoding said address indicating code signals during playback;

comparator means for comparing the decoded address indicating code signals with a signal corresponding to a given desired location on said disc record medium; and means coupled to said comparator means for reading out the signal information located at said given desired location.

2. The apparatus in accordance with claim 1 wherein said control means further comprises:

means for recording the output signals of said mixing means on said disc record medium in a manner such that each frame of signal information is recorded on an elongated track which traces one revolution of the disc.

3. The apparatus in accordance with claim 2 wherein said mixing means includes means for effecting insertion of said address indicating code signals in a given frame of signal information in a manner which locates pairs of consecutive intervals, each interval having one address indicating code signal contained therein, at diametrically opposed locations on the disc when the elongated tracks are recorded thereon.

4. The apparatus in accordance with claim 2 wherein said mixing means output signals include four identical address indicating code signals inserted in each of said consecutive intervals and wherein said control means records two of said identical code signals at a first location on the disc and wherein said control means records the other two of said identical signals at a second diametrically opposed location, relative to said first location, on the disc.

* * * * *

UNITED STATES PATENT AND TRADEMARK OFFICE
CERTIFICATE OF CORRECTION

PATENT NO.   : 4,142,209

DATED        : February 27, 1979

INVENTOR(S)  : Lee Vern Hedlund, et al.

It is certified that error appears in the above-identified patent and that said Letters Patent is hereby corrected as shown below:

In the Abstract, line 7, "recored" should read --recorded--.

Column 3, line 45, insert after "the" --intervals between lines 280 and 281, then lines 281 -- and delete "Fox et al. application."

Column 6, lines 49 and 50, delete "U. S. Application Serial No. 777,477" and insert --Fox et al. application--.

Signed and Sealed this

Twenty-second Day of January 1980

[SEAL]

Attest:

SIDNEY A. DIAMOND

Attesting Officer

Commissioner of Patents and Trademarks